July 16, 1929.  A. CHURCHWARD  1,720,664
ELECTRIC WELDING APPARATUS
Filed Nov. 8, 1926
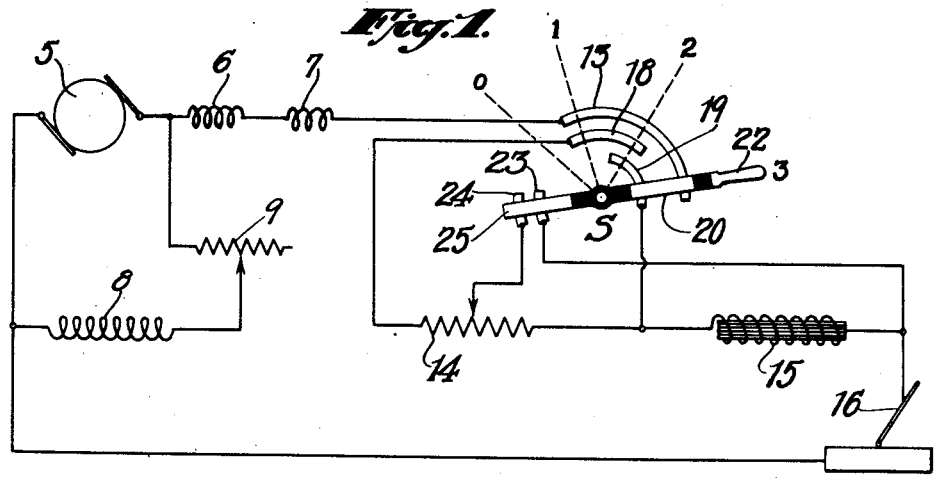
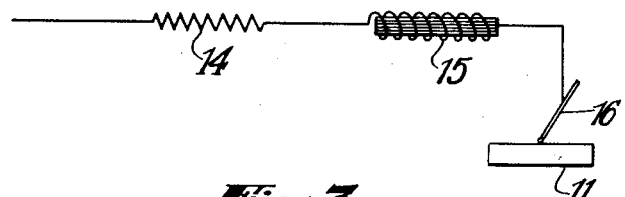
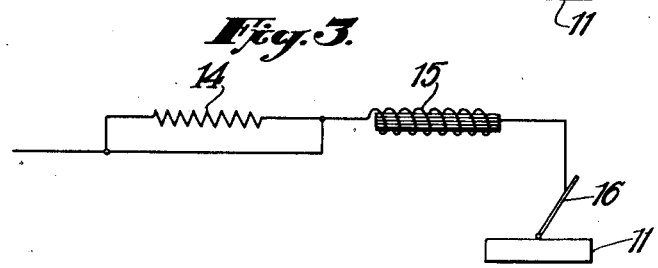
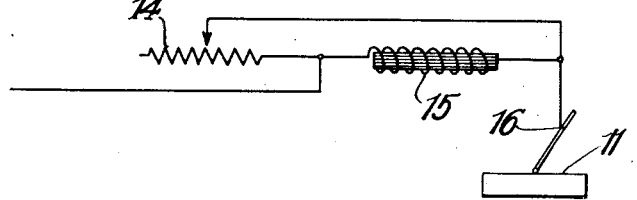
INVENTOR.
ALEXANDER CHURCHWARD.
BY
ATTORNEYS Patented July 16, 1929.

1,720,664

UNITED STATES PATENT OFFICE.

ALEXANDER CHURCHWARD, OF NEW YORK, N. Y., ASSIGNOR TO WILSON WELDER & METALS COMPANY, INC., OF HOBOKEN, NEW JERSEY, A CORPORATION OF NEW YORK.

ELECTRIC WELDING APPARATUS.

Application filed November 8, 1926. Serial No. 147,146.

The present invention relates to electric welding apparatus.

It is well known to those skilled in the art of electric welding that a shunt or under-compounded direct current self-excited generator, when used to supply current for a welding circuit, will recover quickly its open circuit voltage from full load to no load conditions, when furnishing comparatively high current, that is when operating at a high point on the saturation curve of its field; but that such a generator is slow to recover its open circuit voltage, from full load to no load conditions when it is furnishing a comparatively low current, which means that it is operating at a low point on the saturation curve of its field. For example, if such a generator is furnishing current to a welding circuit, and the voltage at the generator terminals is 20 volts and the current in the welding circuit is at 150 ampheres, when the arc is broken the voltage at the generator terminals will almost instantly rise to the normal open circuit voltage, say 45 volts, for which the generator was set by manipulation of the shunt field rheostat before the arc was struck. If, however, the same generator is used to furnish current for the welding of very thin sheet metal, the current in the welding circuit must be lower than 150 amperes, for example, as low as 25 amperes; and in order to obtain this low current, the open circuit voltage of the generator must be reduced substantially below 45 volts, for example to 30 volts. Under this last mentioned condition, that is, with the open circut voltage of the generator reduced to 30 volts, the generator is operating at a low point on the saturation curve of its field, with the result that when the welding circuit is opened by breaking the arc, the generator voltage may either fall or may not rise to its open circuit value quickly enough to allow the welding operator to again establish the arc; with the result either that the electrode sticks to the work or that the arc goes out.

This unsatisfactory condition theoretically may be remedied by including a suitable reactance (which of course necessarily has an appreciable resistance) in the welding circuit. This reactance, due to its resistance, will prevent a self-excited generator having a drooping characteristic from operating at an unstable or low point on the saturation curve of its field; and will also, of course, help to suppress variations in the welding current due to varying arc lengths. It is, however, a fact that a reactance of this kind if designed for use at a moderate welding current, say 150 amperes, would not be suitable for use at a low current, say 25 amperes; and if a reactance were provided with enough turns to serve its function with a welding current of 25 amperes, and yet were capable of carrying the maximum output of the generator, say 250 amperes, the copper in said reactance would have to be of comparatively large cross section and the cost of the reactance would be commercially prohibitive. Moreover, too large a reactance is detrimental to the making of good welds, and such a reactance would probably be too great when welding at say 150 amperes or over, because an unskillful operator using a long flexible arc, such as is given by apparatus of the kind above mentioned, will carelessly draw too long an arc, if the reactance is too large, thereby causing porous and burnt weld.

The general object of the present invention is to provide means for preventing the instantability of the arc in such a welding circuit, when welding at low currents, say 25 amperes, furnished by a generator designed to supply welding current at a maximum of 250 amperes. This object is accomplished in a manner hereinafter described by providing a reactance and a resistance, both of moderate cost, which may be connected in the welding circuit preferably through the manipulation of a suitable switch in such a manner that the welding arc will be stabilized over the entire range of the welding generator, say from 25 to 250 amperes.

The invention will be understood from the following description, taken in connection with the accompanying drawing in which Figure 1 shows diagrammatically a welding generator and circuit having the invention embodied therein; and Figures 2, 3 and 4 respectively show diagrammatically the connections of the resistance and reactance in the welding circuit for the positions of the switch shown in Figure 1 indicated by the numerals 1, 2 and 3.

Referring to Figure 1, 5 indicates the armature, 6 the inter-pole series field, and 7 the main series field of an under-compounded direct current generator having a shunt field 8 capable of being regulated by an adjustable rheostat 9. One of the generator brushes is shown connected with a part 11 to be welded and the other generator brush is connected through the series field windings 6 and 7 to the segment 13 of a switch S by which the relations of a resistance 14 and a reactance 15 to the welding circuit may be regulated; one end of the reactance 15 being connected to the electrode 16 which cooperates with the part 11 to be welded.

The switch S, diagrammatically represented in Figure 1, is shown as having segments 13, 18 and 19 adapted to be engaged and electrically connected by a conducting portion 20 of a manually operable pivoted switch arm 22; and also as having segments 23 and 24 adapted to be engaged by a conducting portion 25 of said switch arm 22; it being understood that the conducting portions 20 and 25 of such switch arm are insulated from one another. From Figure 1, it will be apparent that when the switch arm 22 is in the position indicated by the numeral 0, the welding circuit is open; that when the switch arm 22 is in the position indicated by the numeral 1, the resistance 14 and reactance 15 are connected in series as shown in Figure 2; that when the switch arm 22 is in the position indicated by numeral 2, the resistance 14 and the reactance 15 are still in the welding circuit, but the resistance 14 is short circuited; and that when the switch arm 22 is in the position indicated by the numeral 3, the reactance 15 is still in the welding circuit but is shunted by a portion of the resistance 14.

In the operation of the welding apparatus above described, the arm 22 of the switch S is set at position 1 when welding is to be done at comparatively low current, say 25 to 75 amperes; and with this setting of the switch 8 the resistance 14 and reactance 15 are connected in series as shown in Figure 2. Under this condition, the arc between the electrode 16 and the work 11 will be satisfactorily stabilized by the combined action of the resistance 14 and the reactance 15, the resistance 14 being so proportioned that the drop in voltage across it will cause the generator to operate at a high point on the saturation curve of its field, and the reactance 15 being so designed as to be capable of carrying not the full load current of the generator, 250 amperes, but only say 150 amperes.

When the operator desires to weld at a medium current, say from 75 to 150 amperes, he sets the switch S in position 2, whereupon the resistance 14 is short-circuited and the reactance 15 is left in the welding circuit as shown in Figure 3. Under these circumstances, the reactance 15 acts in the usual manner to give the desired stability to the arc between the electrode 16 and the work 11.

When the welding apparatus is furnishing current at high values, say from 150 to 250 amperes, the switch S is set in position 3, whereupon the reactance 15 and a portion of the resistance 14 are connected in parallel in the welding circuit. With this connection, the effect of the reactance 15 shunted by a portion of the resistance 14 gives the desired stability to the arc over a comparatively high current range, say from 150 to 250 amperes, and yet the reactance 15 will not overheat because it is shunted by a portion of the resistance 14.

From the foregoing, it will be apparent that a self-excited direct-current generator having a drooping characteristic is capable of being used in welding operations requiring wide ranges of current values in the welding circuit, and that when so used even by a comparatively unskilled operator, the arc produced will be stable at all welding currents.

It is to be understood, of course, that the particular arrangements and proportions of parts set forth in the specification are merely illustrative of the invention and that they may be modified in many respects without departing from the spirit thereof, as defined in the claims hereto appended.

I claim—

1. In combination with a self-excited direct current generator having a drooping characteristic adapted to supply current to a welding circuit, a reactance and a resistance adapted to be inserted in said welding circuit, and means for connecting in said circuit either said resistance and reactance in series or said reactance alone or said reactance shunted by a portion of said resistance.

2. In combination with a self-excited direct current generator having a drooping characteristic adapted to supply current to a welding circuit, means for varying the potential at the brushes of said generator, whereby the welding current may be widely varied, a reactance adapted to be inserted in the welding circuit and designed to stabilize the arc when the current in the welding circuit is at substantially a medium value, a resistance, and means for connecting said resistance in series with said reactance when the welding current is at a low value, and in shunt with said reactance when the welding current is at a high value.

3. In combination with a self-excited direct current generator having a drooping characteristic adapted to supply current to a welding circuit, means for varying the voltage at the brushes of said generator whereby the welding current may be widely varied, and means for stabilizing the welding arc comprising a resistance and a reactance connected in series, and means for connecting said reactance and resistance in said circuit when the welding current is low, and short-circuiting said resistance when the welding current is at a medium value, and for connecting a portion of said resistance in shunt to said reactance when the welding current is at a high value.

In testimony whereof, I have affixed my signature to this specification.

ALEXANDER CHURCHWARD.